United States Patent
Wolfson et al.

(10) Patent No.: US 10,802,838 B2
(45) Date of Patent: Oct. 13, 2020

(54) DYNAMIC GRAPHICAL USER INTERFACE PREVIEWS

(71) Applicant: APPLE INC., Cupertino, CA (US)

(72) Inventors: Bryce D. Wolfson, San Jose, CA (US); Christopher P. Saari, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 191 days.

(21) Appl. No.: 15/272,364

(22) Filed: Sep. 21, 2016

(65) Prior Publication Data

US 2017/0199749 A1    Jul. 13, 2017

Related U.S. Application Data

(60) Provisional application No. 62/276,160, filed on Jan. 7, 2016.

(51) Int. Cl.
*G06F 9/451* (2018.01)
*G06F 3/0481* (2013.01)
*G06F 8/38* (2018.01)

(52) U.S. Cl.
CPC ............ *G06F 9/451* (2018.02); *G06F 3/0481* (2013.01); *G06F 8/38* (2013.01)

(58) Field of Classification Search
CPC .. G06F 3/0481; G06F 3/04817; G06F 3/0482; G06F 17/212; G06F 17/30132; G06F 9/445; G06F 9/451
See application file for complete search history.

(56) References Cited

U.S. PATENT DOCUMENTS

| | | | | |
|---|---|---|---|---|
| 5,349,658 A | * | 9/1994 | O'Rourke | G06F 3/0481 715/775 |
| 5,590,264 A | * | 12/1996 | Keane | G06F 3/04817 715/838 |
| 6,928,617 B2 | * | 8/2005 | Druyan | G06F 17/218 715/235 |
| 2009/0319933 A1 | * | 12/2009 | Zaika | G06F 3/048 715/772 |
| 2010/0110108 A1 | * | 5/2010 | Alexandersson | G06K 9/03 345/660 |
| 2011/0004835 A1 | * | 1/2011 | Yanchar | G06Q 10/109 715/763 |

(Continued)

*Primary Examiner* — Amy Ng
*Assistant Examiner* — William Wong
(74) *Attorney, Agent, or Firm* — Jaffery Watson Mendonsa & Hamilton LLP

(57) ABSTRACT

In some implementations, a computing device can present dynamic graphical user interface previews of an application on a display of the computing device. For example, cached graphical user interface (GUI) content can be dynamically generated in response to receiving application data update information for the corresponding application. The computing device can dynamically determine a portion of the cached GUI content to present on a display of the computing device. For example, the cached GUI content can be an image that is larger than the display of the computing device. The computing device can generate a GUI preview based a portion of the cached GUI content that fits on the display of the computing device based on an indication of which portion of the cached GUI content the user wishes to view and present the preview on the display of the computing device.

17 Claims, 5 Drawing Sheets

(56) References Cited

U.S. PATENT DOCUMENTS

| | | | | |
|---|---|---|---|---|
| 2011/0016417 | A1* | 1/2011 | Shiplacoff | G06F 3/0483 |
| | | | | 715/768 |
| 2011/0035673 | A1* | 2/2011 | Chou | G06F 15/16 |
| | | | | 715/739 |
| 2011/0138295 | A1* | 6/2011 | Momchilov | G06F 3/0484 |
| | | | | 715/740 |
| 2011/0167364 | A1* | 7/2011 | Pentikainen | G06F 9/451 |
| | | | | 715/764 |
| 2012/0066629 | A1* | 3/2012 | Lee | G06F 3/04847 |
| | | | | 715/769 |
| 2012/0081375 | A1* | 4/2012 | Robert | G06F 17/30126 |
| | | | | 345/522 |
| 2013/0024808 | A1* | 1/2013 | Rainisto | G06F 3/0488 |
| | | | | 715/784 |
| 2013/0047119 | A1* | 2/2013 | Lee | G06F 3/04883 |
| | | | | 715/800 |
| 2014/0136959 | A1* | 5/2014 | Matas | G06F 17/212 |
| | | | | 715/243 |
| 2014/0281969 | A1* | 9/2014 | Kumar | G06F 3/0482 |
| | | | | 715/711 |
| 2016/0364029 | A1* | 12/2016 | Miller | G06F 3/03547 |

* cited by examiner

DYNAMIC GRAPHICAL USER INTERFACE PREVIEWS

CROSS-REFERENCE TO RELATED APPLICATIONS

This application claims priority to U.S. Provisional Application Ser. No. 62/276,160, filed Jan. 7, 2016, the content of which is incorporated herein by reference in its entirety.

TECHNICAL FIELD

The disclosure generally relates to presenting graphical user interfaces.

BACKGROUND

Most computing devices are configured to run software applications for the use and enjoyment of users of the computing devices. These software applications typically present graphical user interfaces that allow the user to consume information and interact with the features and functionality provided by the software applications. For example, a calendar application can present a graphical user interface that represents a timeline and scheduled events on the timeline. A social media application can present a graphical user interface that represents content submitted by users of the underlying social media web service. When an application is invoked by a user of a computing device, there is often a delay between the time of invocation and the time when the application graphical user interface is displayed. This delay is attributable to the time it takes for the application to initialize and/or update content from a remote network resource. To improve the user experience and make the application and/or computing device appear to be more responsive, a previously cached preview or snapshot of the application graphical user interface can be presented during the initialization period so that the user immediately sees the graphical user interface of the application when the application is invoked.

SUMMARY

In some implementations, a computing device can present dynamic graphical user interface previews of an application on a display of the computing device. For example, cached graphical user interface (GUI) content can be dynamically generated in response to receiving application data update information for the corresponding application. The computing device can dynamically determine a portion of the cached GUI content to present on a display of the computing device. For example, the cached GUI content can be an image that is larger than the display of the computing device. The computing device can generate a GUI preview based a portion of the cached GUI content that fits on the display of the computing device based on an indication of which portion of the cached GUI content the user wishes to view and present the preview on the display of the computing device.

Particular implementations provide at least the following advantages. The user experience is improved by quickly presenting a graphical user interface preview for the invoked application thereby giving the user the perception of a more responsive system. By generating a preview of a set of predictive graphical user interface content for an application graphical user interface, the computing device can dynamically select specific information of interest to, or requested by, a user for presentation in the graphical user interface preview image. By dynamically updating the cached graphical user interface content, the graphical user interface preview will be include more up to date information than a static graphical user interface preview.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

System Overview

Figure 1:
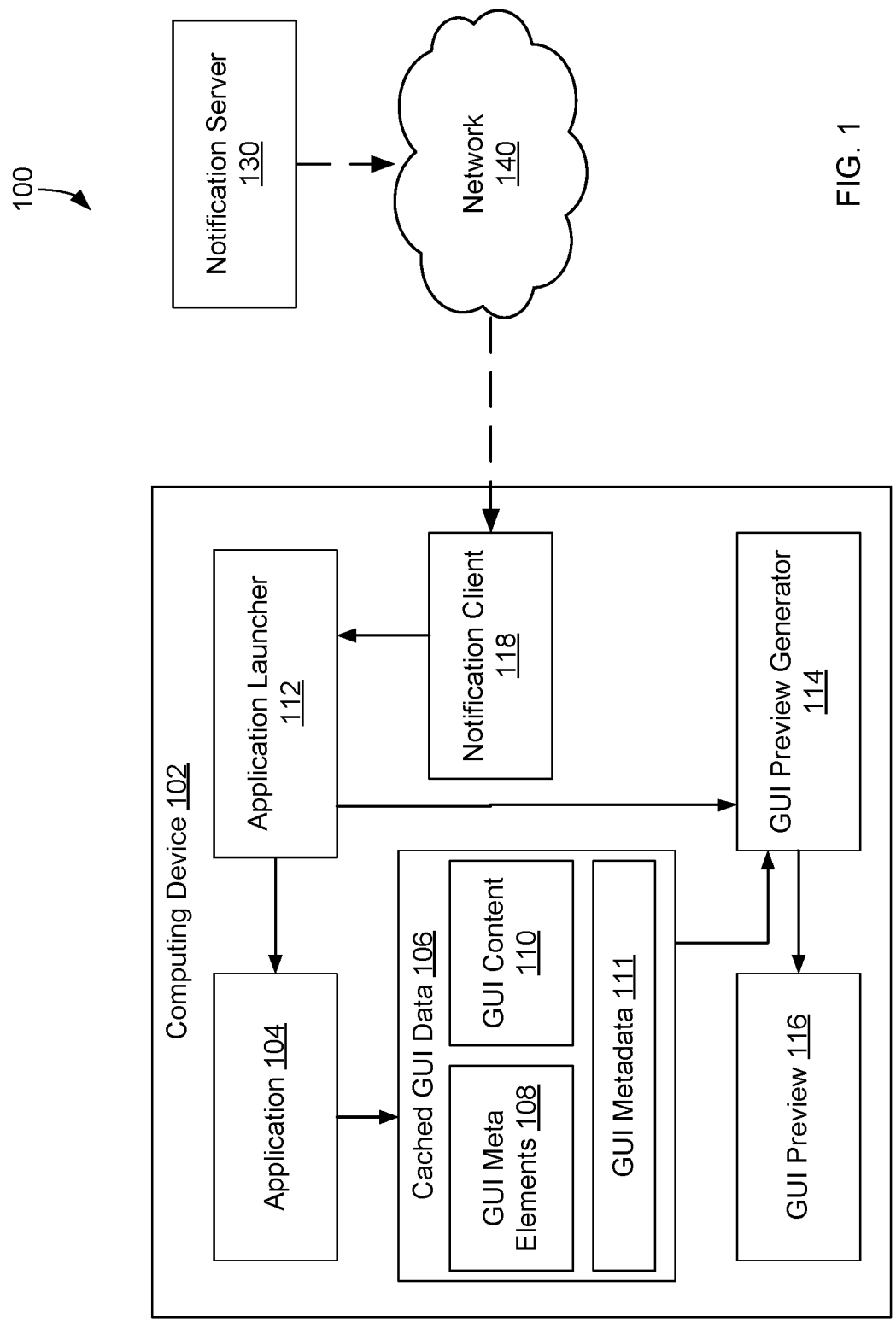
FIG. 1 illustrates an example system for implementing dynamic graphical interface previews.

FIG. 1 illustrates an example system 100 for implementing dynamic graphical interface previews. In some implementations, system 100 can include computing device 102. Computing device 102 can be, for example, a desktop computer, a laptop computer, a handheld device (e.g., a smartphone, tablet computer, etc.), or a wearable device (e.g., a smart watch).

In some implementations, computing device 102 can include application 104. For example, application 104 can be software application installed on computing device 102. Application 104 can be, for example, a calendar application, a social media application, or any other application that generates a graphical user interface for presentation on a display of computing device 102.

In some implementations, application 104 can generate cached graphical user interface data 106. For example, application 104 can be invoked by a user operating computing device 104. When the user is finished using application 104, application 104 can be terminated or suspended so that other processes (e.g., applications, utilities, operating system functions, etc.) can use the processing resources of computing device 102. As application 104 is shutting down, application 104 can generate cached GUI data 106 that represents the state of a graphical user interface of application 104 at the time when application 104 is shutting down. For example, if application 104 is calendar application, application 104 can generate cached GUI data (e.g., a snapshot, an image, etc.) representing calendar content (e.g., a timeline, scheduled events, tasks, etc.) that may be presented on a graphical user interface of application 104 when application 104 is later invoked. Application 104 can store cached GUI data in a data cache (e.g., volatile memory, non-volatile memory, persistent storage, etc.) on computing device 102.

In some implementations, cached GUI data 106 can include GUI meta elements 108. For example, GUI meta elements 108 can include representations (e.g., images, graphical data, etc.) of GUI elements that describe the content displayed by a graphical user interface. If application 104 is a calendar application, then GUI meta elements 108 can include a header, title, or banner that describes which calendar is being presented on the GUI of application 104. GUI meta elements 108 can, for example, describe a period of time or other description of the GUI content presented by the GUI of application 104. GUI meta elements 108 can include all-day event banners, pending invitations, and/or other meta elements. If application 104 is a social media application, GUI meta elements 108 can include graphical elements (e.g., header, banner, footer, etc.) describing the social media content presented by the GUI of application 104. For example, GUI meta elements 108 can indicate which social media user's account is represented by the content presented on the GUI of application 104.

In some implementations, cached GUI data 106 can include GUI content 110. For example, GUI content 110 can include representations (e.g., images, GUI background, etc.) of the content data presented on a GUI of application 104. For example, if application 104 is a calendar application, GUI content 110 can include a representation (e.g., image) of a calendar timeline (e.g., a 24 hour period, a week period, etc.) with scheduled events at appropriate places on the calendar timeline. If application 104 is a social media application, GUI content 110 can include a GUI background with social media posts and other content organized (e.g., according to time, relevance, user interests, relationship of user to posting user, etc.) over the GUI background.

In some implementations, GUI content 110 can include representations of content data that exceed the size of the display of computing device 102. For example, if computing device 102 is a smart watch with a 390×312 pixel display, the entire cached GUI data 106 may not fit on the smart watch's small display. Continuing the calendar application example, when application 104 generates GUI content 110 representing calendar entries for a 24 hour period, the smart watch may not be able to fit the entire 24 hour representation of calendar entries on the 390×312 pixel display such that the calendar entries are easy to discern by the user. Similarly, if application 104 is a social media application, GUI content 110 representing the last 50 social media entries posted to the user's account may not fit on the 390×312 pixel display such that the social media entries are easy to discern by the user. Thus, computing device 102 can be configured to present a portion of GUI content 110 on a display of computing device 102, as described further below.

In some implementations, cached GUI data 106 can include GUI metadata 111 that includes information on how to utilize GUI meta elements 108 and GUI content 110 when providing a preview. For example, GUI metadata 111 can indicate which portion of GUI content 110 should be displayed to represent a particular time, calendar event, or social media post; how to arrange elements for different-sized screens (imagine handling either portrait or landscape on a phone with the same backing resources), and/or other metadata that describes how to use cached GUI data 106 to generate a GUI preview for application 104. For example, GUI metadata 111 can include a mapping of indices to locations in GUI content 110 so that GUI preview generator 114 can generate GUI preview 116, as described below.

In some implementations, after application 104 generates and stores cached GUI data 106, application 104 can be shut down or suspended until application 104 is invoked by the user or another process. For example, to conserve battery power, CPU processing cycles, network data usage, etc., application 104 can be shut down or suspended when not being used by the user or other processes running on computing device 102.

In some implementations, computing device 102 can generate a preview image of a GUI of application 104 based on cached GUI data 106 when application 104 is invoked on computing device 102. For example, a user of computing device 102 can provide user input to invoke application 104. If application 104 is a calendar application, the user may invoke application 104 from a clock application on computing device 102. For example, the clock application may allow the user to specify a time of day and provide a graphical element that when selected by the user invokes application 104 so that the user can view the calendar events scheduled for the specified time of day. If application 104 is a social media application, the user may invoke application 104 from a contacts application (e.g., address book) on computing device 102. For example, the address book application may allow the user to select a contact (e.g., a friend, family member, coworker, etc.) and provide a graphical element that when selected by the user invokes application 104 so that the user can view social media content related to the selected contact.

In some implementations, upon receiving the selection of the graphical element in the clock application or contacts application, the contacts or clock application can send a request to application launcher 112 to launch application 104. For example, the request can include the name of the selected contact. The request can include the selected time of day. Alternatively, the selected contact information and/or the selected time of day information can be stored locally on computing device 102 so that the information can be later obtained and used to generate a preview of a GUI of application 104, as described further below.

In some implementations, application launcher 112 can cause computing device 102 to present a preview image of a GUI of application 104 when launching application 104. For example, in response to receiving the request to launch application 104, application launcher 112 can invoke application 104. However, application 104 may take some time to initialize and present a GUI of application 104. Thus, to minimize the user's perception of a delay when launching application 104, application launcher 112 can also invoke GUI preview generator in response to receiving the request to launch application 104. Application launcher 112 can invoke GUI preview generator before or after invoking application 104, for example.

In some implementations, application launcher 112 can send an application identifier for application 104 to preview generator 114 when invoking GUI preview generator 114. For example, when computing device 102 stores cached GUI data 106 for multiple applications installed on computing device 102, GUI preview generator 114 can use the application identifier to identify and obtain cached GUI data 106 corresponding to application 104.

In some implementations, application launcher 112 can send GUI content index data for application 104 to preview generator 114 when invoking GUI preview generator 114. For example, GUI content index data can be used by GUI preview generator 114 to determine which portion of GUI content 110 should be used to generate GUI preview 116. The GUI content index data can include, for example, information (e.g., name, email address, handle, identifier, etc.) that identifies the user-selected contact from the contacts application described above. The GUI content index data can include, for example, information (e.g., date, time, etc.) that identifies the user-selected time from the clock application described above.

In some implementations, application launcher 112 can send display size information to preview generator 114 when invoking GUI preview generator 114. For example, application launcher can send the dimensions (e.g., pixel dimensions, screen size, etc.) of the display of computing device 102 to preview generator 114. Preview generator 114 can use the display dimensions to generate a GUI preview 116 that fits the specified display size.

In some implementations, GUI preview generator 114 can generate GUI preview 116 based on cached GUI data 106. For example, GUI preview generator 114 can obtain cached GUI data 106 based on the application identifier received when application launcher 112 invokes GUI preview generator 114, as described above. After GUI preview generator 114 obtains cached GUI data 106 for application 104, GUI preview generator can combine GUI meta elements 108 with a portion of GUI content 110 to generate GUI preview 116. For example, if application 104 is the calendar application, GUI preview generator 114 can combine the calendar header image in GUI meta elements 108 with a portion of the calendar timeline and events image in GUI content 110 corresponding to the time selected by the user in the clock application to generate a preview image of a graphical user interface of application 104. If application 104 is the social media application, GUI preview generator 114 can combine the social media meta elements images in GUI meta elements 108 with a portion of the social media content data corresponding to the contact selected by the user in the contacts application to generate a preview image of a graphical user interface of application 104.

In some implementations, application launcher 112 can present GUI preview 116 on the display of computing device 102. For example, after GUI preview generator 114 generates GUI preview 116 based on cached GUI data 106, GUI preview generator 114 can send GUI preview 116 to application launcher 112. Application launcher 112 can cause computing device 102 to present GUI preview 116 on a display of computing device 102. Computing device 102 can continue to present GUI preview 116 (e.g., an image) on the display of computing device 102 until application 104 has finished initializing and/or updating (e.g., downloading) content and is ready to present an active (e.g., live, interactive) graphical user interface on the display of computing device 102. After application 104 is finished initializing, application 104 can present a graphical user interface on the display of computing device 102 thereby replacing GUI preview 116.

Updating Cached GUI Data

In some implementations, computing device 102 can cause application 104 to refresh cached GUI data 106 based on detected events associated with application 104. For example, computing device 102 can detect an event associated with application 104 when content updates are available for application 104. Computing device 102 can detect an event associated with application 104 when the state of computing device 102 changes (e.g., location change, time zone change, charging state, battery conditions, etc.) and those state changes effect application 104.

In some implementations, application 104 can update application content or application data when application 104 is invoked by a user of computing device 102. For example, when invoked by the user, application 104 can connect through network 140 (e.g., the Internet, local area network, wide area network, etc.) to network resources (e.g., an email server, calendar server, social network server, etc.) to obtain content updates so that application 104 can present up-to-date content when generating and displaying a graphical user interface or cached GUI data 106 for application 104. However, if application 104 only updates content when invoked by a user, the content (e.g., GUI content 110) stored for application 104 locally on computing device 102 will quickly become out of date (e.g., stale).

In some implementations, computing device 102 can cause application 104 to refresh cached GUI data 106 when notified of content updates for application 104. For example, notification client 118 on computing device 102 can receive content update notifications from notification server 130 through network 140. For example, the content update notifications can indicate a priority (e.g., high priority, low priority, etc.) for the content update. The content update notifications can indicate the type of content update. For example, if application 104 is the calendar application, the type of content update can include a new event added to the calendar, a change in date and/or time for an existing calendar event, a change in location for an existing calendar event, a change in the description of the calendar event, changes to invitees to the calendar event, and/or other changes to calendar content or data.

Each of these calendar updates can be classified as a high priority update or a low priority update. For example, calendar content updates that change the location or appearance of a calendar event on the calendar timeline (e.g., new calendar events, changes in event date or time, etc.) can be classified as a high priority update. Calendar updates that merely change informational data (e.g., location changes, descriptions, etc.) can be classified as low priority updates. Notification client 118 can, for example, classify content updates as high priority or low priority updates based on the type of content update indicated in the content update notification.

When notification client 118 receives a content update notification for application 104, notification client 118 can determine when to invoke application 104 to perform a content update based on the priority of the content update. For example, when notification client 118 receives a high priority update, notification client 118 can immediately (or near immediately) invoke application 104. Notification client 118 can send an application invocation request to application launcher 112 to cause application launcher 112 to launch application 104 as a background process on computing device 102 so that application 104 can perform a background (e.g., hidden from the user, not presented on a display) update of content from corresponding network resources (e.g., email server, calendar server, social media server, etc.).

In some implementations, notification client 118 can coalesce content update notifications when low priority update notifications are received from notification server 130. For example, instead of invoking application 104 when each low priority update is received, notification client 118 can coalesce (e.g., combine, aggregate, batch, etc.) low priority update notifications according to a coalescing interval (e.g., 5 minutes, 3 minutes, etc.) to conserve resources (e.g., battery power, network data usage, etc.) of computing device 102. For example, when notification client 118 receives a low priority content update notification from notification server 130, notification client 118 can start a timer that expires after an amount of time corresponding to the coalescing interval has elapsed. If additional low priority content update notifications are received by notification client 118 during the coalescing interval, these notifications will be coalesced with low priority notifications that have already been received during the coalescing interval. When the timer expires, notification client 118 can invoke application 104 to perform a background update of application 104 so that application 104 can receive the content updates indicated by the low priority content update notifications.

In some implementations, when a high priority content update notification is received during the coalescing interval, notification client 118 can immediately (or near immediately) invoke application 104 so that application 104 can perform a background update. For example, when a high priority content update notification is received during the coalescing interval, notification client 118 can cancel or terminate the coalescing timer and request that application launcher 112 launch application 104 as a background process. In response to the request, application launcher 112 can launch (e.g., execute) application 104 as a background process. When launched, application 104 can receive content updates from corresponding network resources while running as a background process. Thus, a high priority content update notification can cause application 104 to immediately (or near immediately) obtain both high priority content updates and low priority content updates.

In some implementations, computing device 102 can invalidate cached GUI data 106 based on detected system events. For example, when computing device 102 is moved to a new time zone, computing device 102 can detect the change in location, update the time zone information of computing device 102, and adjust internal clocks of computing device 102 based on the new time zone information. If application 104 is a calendar application, application 104 will update calendar content according to the new time zone. Accordingly, any GUI content 110 stored for the calendar application using the previous time zone will become invalid. Thus, when computing device 102 moves to a new time zone (or locale), computing device 102 can detect the change in time zone and invalidate the cached GUI data 106.

In some implementations, computing device 102 can invalidate cached GUI data 106 by indicating (e.g., using a flag, bit of data, Boolean value, etc.) the invalidated status of cached GUI data 106 in GUI metadata 111. For example, computing device 102 can store a false (e.g., zero) value in a "valid" data field of GUI metadata 111 when cached GUI data 106 has been invalidated. Application 104 can supply a true (e.g., one) value for the "valid" data field of GUI metadata 111 when cached GUI data 106 is generated.

In some implementations, when application 104 is subsequently launched, GUI preview 116 will not be displayed and the user will have to wait for application 104 to initialize before viewing the GUI of application 104. For example, GUI preview generator 114 can obtain GUI metadata 111, determine that the "valid" data field indicates that cached GUI data 106 has been invalidated (e.g., zero value), and return an error to application launcher 112 indicating that there is no cached GUI data 106 available for generating GUI preview 116. Alternatively, when cached GUI data 106 is invalidated, application launcher 112 can launch application 104 to perform a background update so that application 104 can generate new cached GUI data 106 based on the new time zone of computing device 102.

Figure 2:
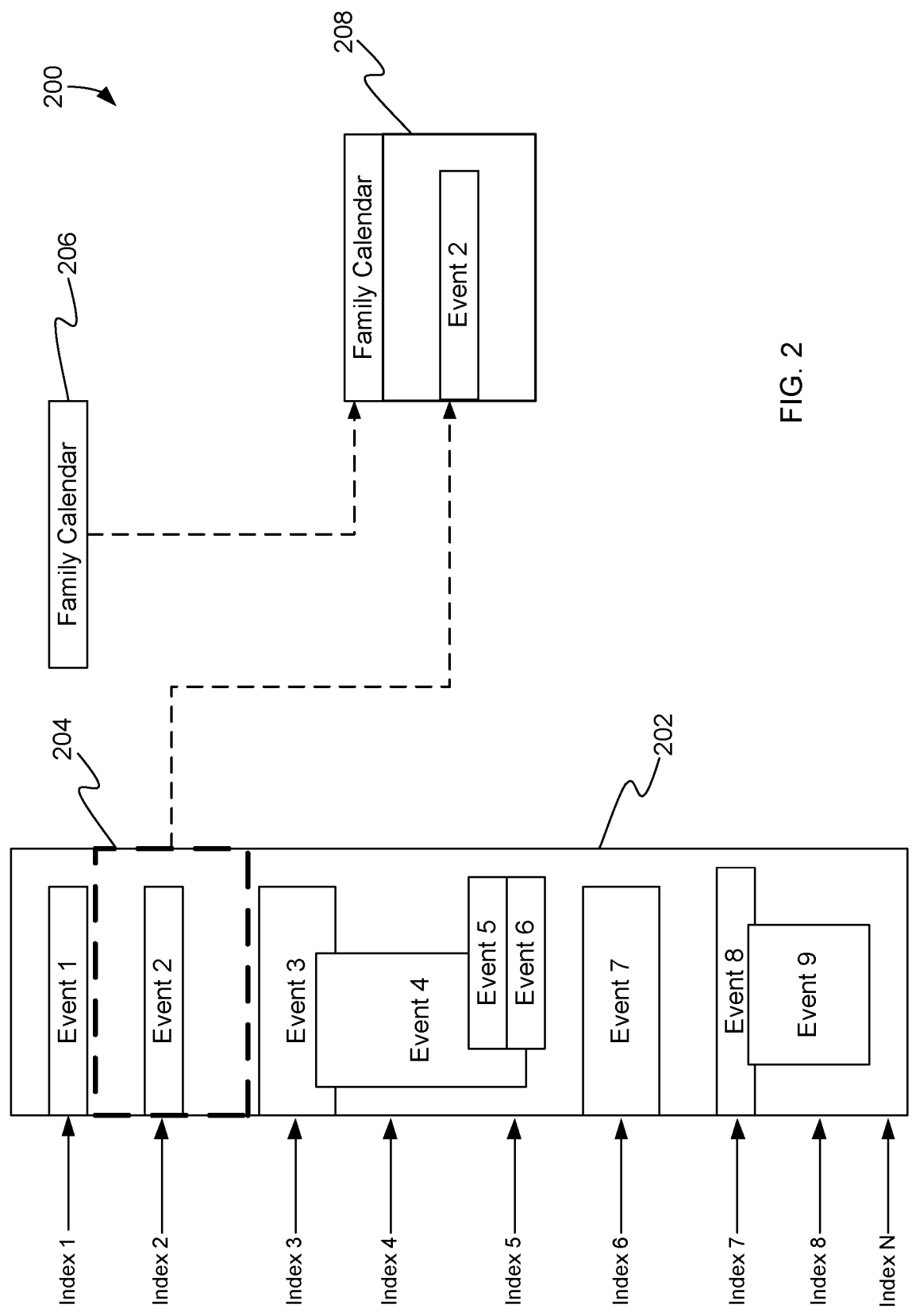
FIG. 2 is an illustration demonstrating dynamically generating a graphical user interface preview based on cached graphical user interface data.

FIG. 2 is an illustration 200 demonstrating dynamically generating a graphical user interface preview based on cached graphical user interface data. For example, illustration 200 includes GUI content 202. GUI content 202 can, for example, correspond to GUI content 110 of FIG. 1. For example, GUI content 202 can be generated by a calendar application (e.g., application 104) running on computing device 102. GUI content 202 can represent a calendar timeline graphical user interface element for a calendar application representing various scheduled events. GUI content 202 can include a timeline and corresponding events for a period of time (e.g., 12 hours, 24 hours, 1 week, etc.). In some implementations, GUI content 202 is a single image that represents how the calendar timeline and corresponding events will appear when presented by the calendar application on a graphical user interface of the calendar application.

In some implementations, GUI content 202 is multiple segmented images that represent portions of the calendar timeline and corresponding events. For example, there may be multiple 24-hour images, each representing an individual day. Or a day or list view may be segmented to allow inserting, removing, moving, updating individual pieces without the expense of recreating a large image where only a small portion has changed. Data representing how these segments are used might be stored in GUI metadata 111. For example, this data could be part of the index mapping or might be an underlying table so that the portion of the implementation handling the index mapping is unaware that the image underlying the mapping is being assembled from smaller segments or fragments.

In some implementations, GUI content 202 can have a corresponding index mapping. For example, when the calendar application generates GUI content 202, the calendar application can generate an index mapping that maps indices to locations within the image. For the calendar application, each index can be a time of day and each time of day can be mapped to a location in the image corresponding to that time of day. When GUI content 202 corresponds to a social media application, each index can be an identifier for a social media contact (e.g., friend, connection, etc.) and each identifier can be mapped to a location in the image where a posting from the identified contact is displayed.

In some implementations, a portion of GUI content 202 can be used to generate a GUI preview for the calendar application. For example, GUI content 202 may be too large to present on the display of the computing device. The computing device may be a smart watch with a small display, for example. Thus, only a portion (e.g., represented by dashed line 204) of GUI content 202 may be used by GUI preview generator 114 to generate GUI preview 116 for the calendar application. The portion of GUI content 202 used for GUI preview 116 can be determined based on user-specified index information. By generating GUI content 202 that includes more data than is required for the small display of computing device 102, computing device 102 (e.g., preview generator 114) is given the flexibility to select which portions of GUI content 202 are most relevant to the requesting user thereby providing a more dynamic user experience even though the underlying GUI content data may be a static image.

As described above, the user of computing device 102 can specify a time of day when invoking the calendar application or a contact when invoking the social media application. The user specified time of day can be used by GUI preview generator 114 to determine the portion of GUI content 202 to use when generating GUI preview 116. The GUI preview generator 114 can, for example, compare the user-specified time of day to the index mapping for GUI content 202 to determine which GUI content index corresponds to the user-specified time of day. GUI preview generator 114 can use the index mapping to determine the location in GUI content 202 corresponding to the index. GUI preview generator 114 can generate GUI preview 116 based on a portion of GUI content 202 corresponding to the indexed location in GUI content 202. For example, the size of the portion of GUI content 202 can be determined based on the size of the display of computing device 102. If the display of computing device 102 is 390×312 pixels, then the portion of GUI content 202 selected for generating GUI preview 116 should be equal to or smaller than 390×312 pixels.

Illustration 200 includes GUI meta element 206. For example, GUI meta elements 206 can correspond to GUI meta elements 108 of FIG. 1. While only one GUI meta element 206 is show in illustration 200, more than one GUI meta element 206 may be used by GUI preview generator 114 to generate a GUI preview. In some implementations, GUI meta element 206 can be an image representing meta elements of a GUI of the calendar application described above. For example, meta elements can be headers, banners, footers, ribbons, and/or other graphical user interface elements that describe, classify, or organize content presented on a graphical user interface of an application. For example, GUI meta element 206 describes which calendar ("Family Calendar") of the calendar application is represented by GUI content 204. When GUI meta element 206 is generated by the calendar application, the calendar application can generate metadata for GUI meta element 206 indicating where GUI meta element 206 should be located when generating GUI preview 116. For example, the metadata can specify that GUI meta element 206 should be placed at the top of GUI preview 116, as a header or banner. The metadata can specify that GUI meta element 206 should be placed at the bottom of GUI preview 116, as a footer.

Illustration 200 includes GUI preview 208. For example, GUI preview 208 can correspond to GUI preview 116 of FIG. 1. GUI preview generator 114 can generate GUI preview 208 by combining the portion 204 of GUI content data 202 with GUI meta element 206. The GUI meta element 206 can be positioned in GUI preview 208 according to the metadata for GUI meta element 206. After GUI meta element 206 and GUI content data portion 204 are combined into a single image, GUI content generator 114 can present GUI preview 208 on the display of computing device 102.

As indicated above, while the dynamic GUI preview generation techniques described above were primarily described with reference to a calendar application, these techniques can be applied to other types of applications and application content data. For example, these techniques can be applied to a variety of social media applications, e-commerce applications, and/or other applications when installed on computing device 102.

Example Processes

Figure 3:
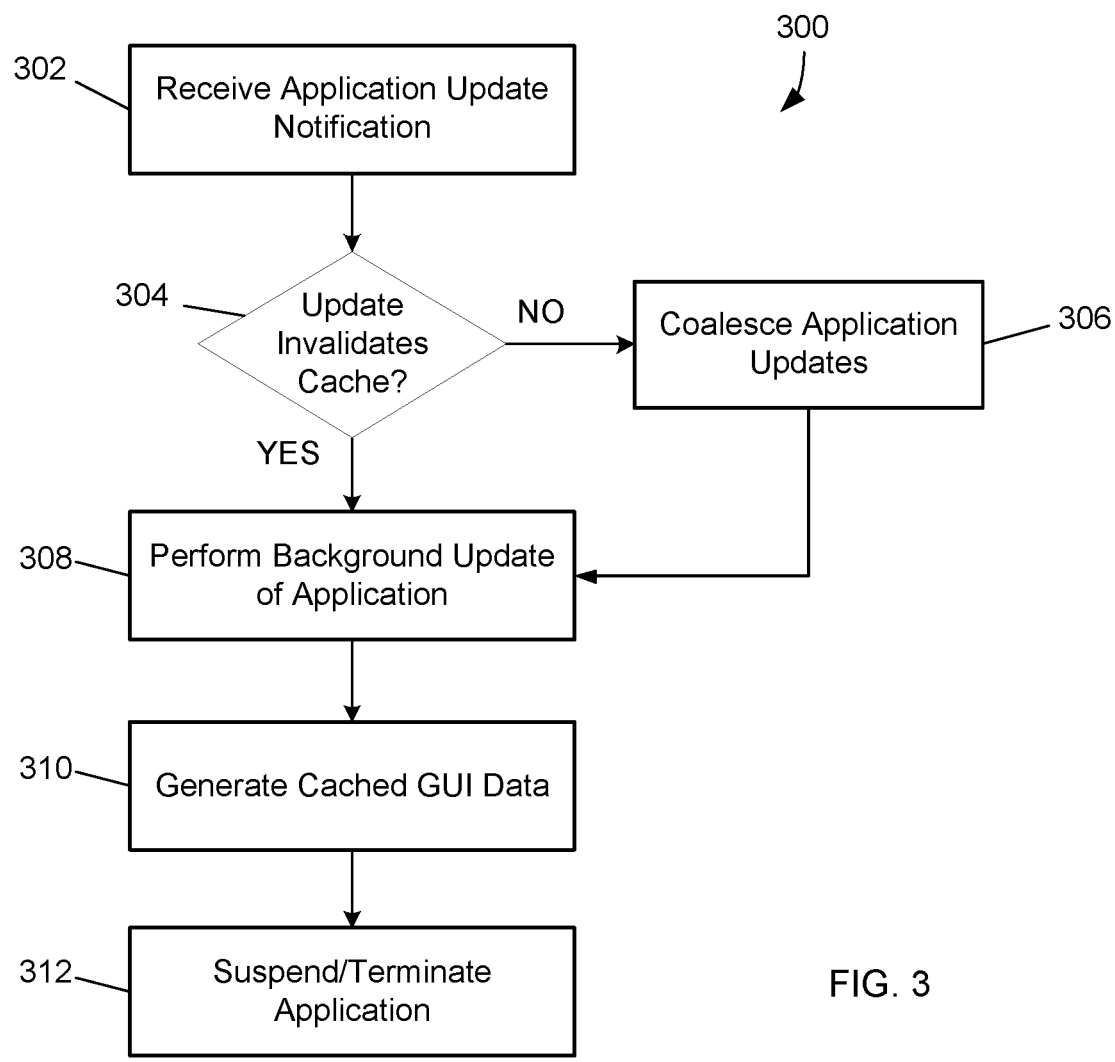
FIG. 3 is flow diagram of an example process for updating cached graphical user interface data.

FIG. 3 is flow diagram of an example process 300 for updating cached graphical user interface data. For example, process 300 can be performed by computing device 102 to keep cached GUI data 106 of application 104 up to date while conserving battery, processing, and network resources.

At step 302, computing device 102 can receive an application update notification. For example, notification client 118 can receive an application update notification from notification server 130 indicating that updated content data for application 104 is available from a network resource associated with application 104.

At step 304, computing device 102 can determine whether the application update notification invalidates cached GUI data 106. For example, when the application update notification indicates a high priority application update is available for application 104, computing device 102 can determine that the application update notification invalidates cached GUI data 106 and process 300 can proceed directly to step 308. When the application update notification indicates a low priority application update is available for application 104, computing device 102 can determine that the application update notification does not invalidate cached GUI data 106.

At step 306, computing device 102 can coalesce application update notifications. For example, instead of immediately invoking application 104 to perform a background update of application content data, computing device 102 can collect low priority application update notifications over a period of time (e.g., the coalescing interval) and invoke application 104 when the period of time has elapsed. Thus, application 104 can be launched once to perform multiple low priority updates instead of being launched multiple times and wasting power and data resources of computing device 102.

At step 308, computing device 102 can perform a background update of application 104. For example, when the coalescing time interval elapses at step 306 or when a high priority application update notification is received at step 302, computing device 102 can launch application 104 as a background process so that application 104 can obtain updated content data from network resources associated with application 104.

At step 310, computing device 102 can generate updated cached GUI content. For example, after performing the background update and before shutting down or suspending, application 104 can generate cached GUI data 106 based on the updated application content data received from the network resources associated with application 104. The updated cached GUI content data 106 can be stored on computing device 106 so that GUI preview generator 114 can later use cached GUI content data 106 to generate GUI preview 116.

At step 312, computing device 102 can suspend or terminate application 104. For example, after application 104 obtains the updated content data and after application 104 generates the updated cached GUI content data 106, computing device 102 can suspend or terminate application 104 to conserve the power and computing resources of computing device 102.

Figure 4:
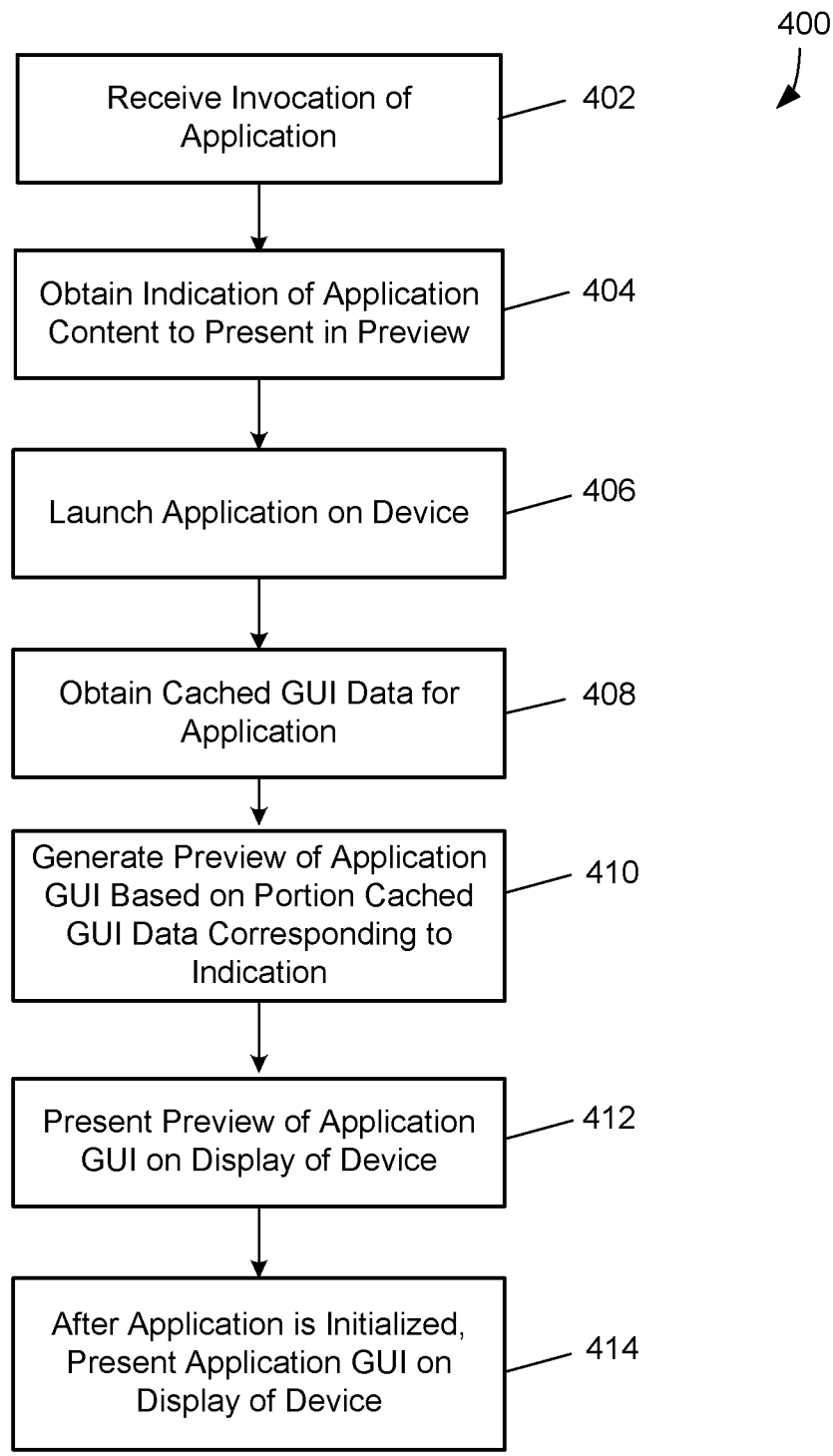
FIG. 4 is a flow diagram of an example process for generating a preview of a graphical user interface of an application on a computing device.

FIG. 4 is a flow diagram of an example process 400 for generating a preview of a graphical user interface of an application on computing device 102. For example, the preview can be dynamically generated based on cached GUI data 106 stored on computing device 102. The preview can be dynamically generated based on information (e.g., index data) indicating which portion of cached GUI data 106 should be presented to the user in the GUI preview.

At step 402, computing device 102 can receive an invocation of application 104 on computing device 102. For example, application 104 can be invoked by a user or by another process (e.g., application) running on computing device 102. Application 104 can be invoked when computing device 102 receives user input indicating that the user wishes to interact with application 104, for example. Application 104 can be invoked when another application on computing device 102 requests that application 104 be executed or launched on computing device 102.

At step 404, computing device 102 can obtain an indication of application GUI content to present in the GUI preview. For example, when application 104 is invoked, the invocation can include parameters that specify content or context for the application invocation. For example, the parameters can specify that specific application content is being requested (e.g., information about a user, information about a time of day, information about a social media contact). The parameters can specify a context surrounding the invocation of application 104. For example, the context can be the current time of day, a contact that the user is currently viewing, etc. These content and/or context parameters can be used by GUI preview generator as indices into GUI content 110 stored by computing device 102, as described above.

At step 406, computing device 102 can launch application 104 on computing device 102. For example, computing device 102 can execute application 104 to cause application 104 to begin its initialization process. During initialization, application 104 can connect to various network resources to update the state and/or content of application 104. Since the initialization and content updating process may take some time, computing device 102 can present a GUI preview for application 104 while application 104 is being initialized, as described further below.

At step 408, computing device 102 can obtain cached GUI content for application 104. For example, computing device 102 can use an application identifier for application 104 to obtain cached GUI data 106 from storage on computing device 102. Since computing device 102 may store cached GUI content for many different applications, the application identifier for application 104 can be used to distinguish cached GUI data 106 for application 104 from cached GUI data stored for other applications on computing device 102.

At step 410, computing device 102 can generate a preview of a GUI for application 104 based on a portion of cached GUI data 106 corresponding to the indication received at step 404. For example, computing device 102 can determine a portion of GUI content 110 to use when generating the GUI preview based on the index information received in the invocation of application 104. Computing device 102 can combine GUI meta elements 108 and the portion of GUI content 110 from cached GUI data 106 to generate GUI preview 116, as described above with reference to FIG. 1 and FIG. 2.

At step 412, computing device 102 can present the preview of the application GUI on the display of computing device 102. For example, after GUI preview 116 is generated, computing device 102 can present GUI preview 116 on a display of computing device 102.

At step 414, computing device 102 can present a live application GUI on the display of computing device 102 after application 104 is initialized. For example, after application 104 has been initialized and is ready for use, application 104 can present a live, interactive GUI on the display of computing device 102 thereby replacing the temporary GUI preview 116 for application 104 displayed at step 412.

Example System Architecture

Figure 5:
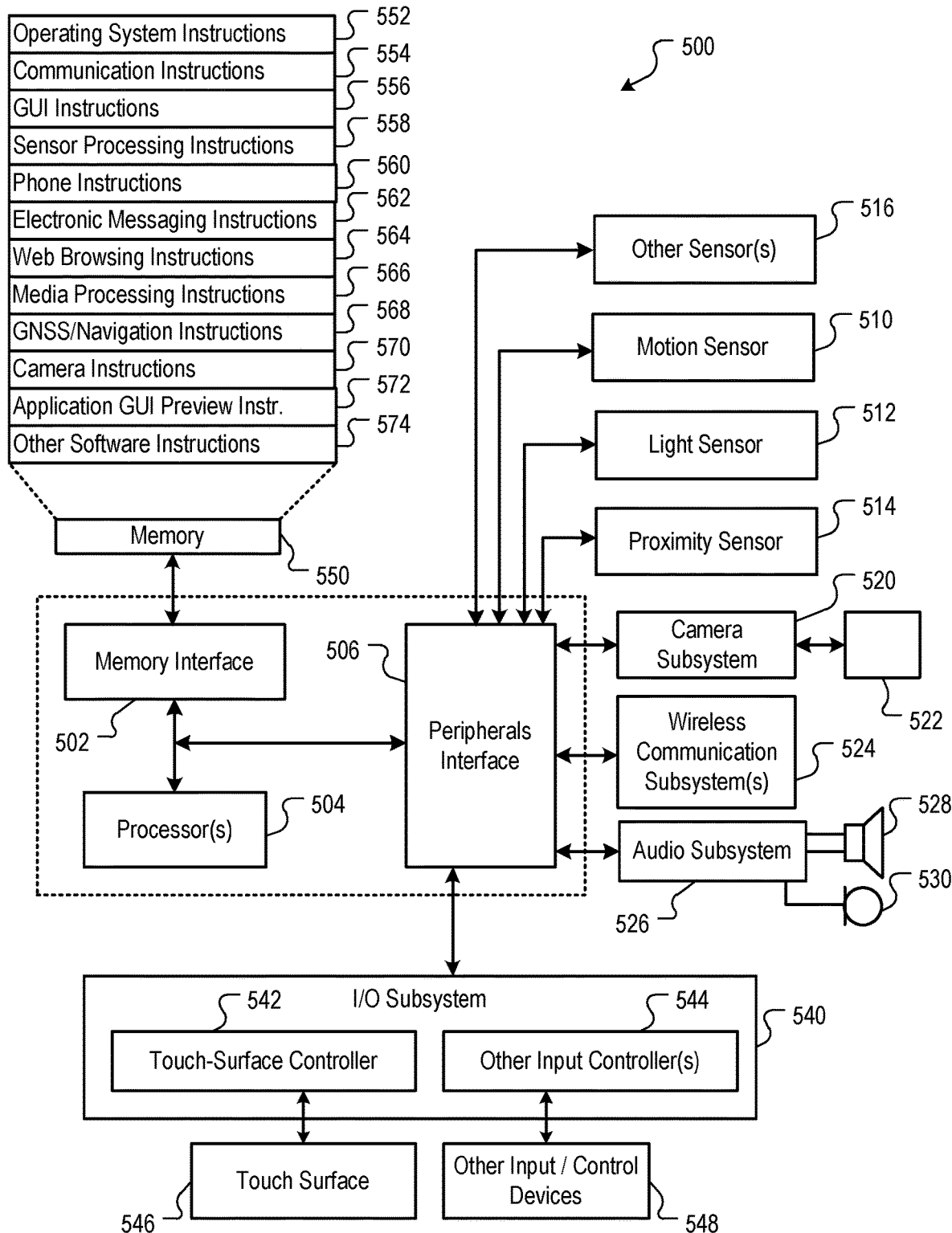
FIG. 5 is a block diagram of an example computing device that can implement the features and processes of FIGS. 1-4.

FIG. 5 is a block diagram of an example computing device 500 that can implement the features and processes of FIGS. 1-4. The computing device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the computing device 500 can be coupled by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. Other sensors 516 can also be connected to the peripherals interface 506, such as a global navigation satellite system (GNSS) (e.g., GPS receiver), a temperature sensor, a biometric sensor, magnetometer or other sensing device, to facilitate related functionalities.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips. The camera subsystem 520 and the optical sensor 522 can be used to collect images of a user to be used during authentication of a user, e.g., by performing facial recognition analysis.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the computing device 500 is intended to operate. For example, the computing device 500 can include communication subsystems 524 designed to operate over a GSM™ network, a GPRS network, an EDGE network, a WI-FI® or WIMAX™ network, and a Bluetooth™ network. In particular, the wireless communication subsystems 524 can include hosting protocols such that the device 100 can be configured as a base station for other wireless devices.

An audio subsystem 526 can be coupled to a speaker 528 and a microphone 530 to facilitate voice-enabled functions, such as speaker recognition, voice replication, digital recording, and telephony functions. The audio subsystem 526 can be configured to facilitate processing voice commands, voiceprinting and voice authentication, for example.

The I/O subsystem 540 can include a touch-surface controller 542 and/or other input controller(s) 544. The touch-surface controller 542 can be coupled to a touch surface 546. The touch surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration can disengage a lock of the touch surface 546; and a pressing of the button for a second duration that is longer than the first duration can turn power to the computing device 500 on or off. Pressing the button for a third duration can activate a voice control, or voice command, module that enables the user to speak commands into the microphone 530 to cause the device to execute the spoken command. The user can customize a functionality of one or more of the buttons. The touch surface 546 can, for example, also be used to implement virtual or soft buttons and/or a keyboard.

In some implementations, the computing device 500 can present recorded audio and/or video files, such as MP3, AAC, and MPEG files. In some implementations, the computing device 500 can include the functionality of an MP3 player, such as an IPOD®. The computing device 500 can, therefore, include a 36-pin connector that is compatible with the IPOD®. Other input/output and control devices can also be used.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin®, RTXC, LINUX®, UNIX®, OS X®, WINDOWS®, or an embedded operating system such as VWORKS®.

The operating system 552 can include instructions for handling basic system services and for performing hardware dependent tasks. In some implementations, the operating system 552 can be a kernel (e.g., UNIX kernel). In some implementations, the operating system 552 can include instructions for performing voice authentication. For example, operating system 552 can implement the dynamic graphical user interface preview features as described with reference to FIGS. 1-4.

The memory 550 can also store communication instructions 554 to facilitate communicating with one or more additional devices, one or more computers and/or one or more servers. The memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions; and/or camera instructions 570 to facilitate camera-related processes and functions.

The memory 550 can store other software instructions 572 to facilitate other processes and functions, such as the dynamic graphical user interface preview processes and functions as described with reference to FIGS. 1-4.

The memory 550 can also store other software instructions 574, such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the computing device 500 can be implemented in hardware and/or in software, including in one or more signal processing and/or application specific integrated circuits.

What is claimed is:

1. A method comprising:
    receiving, by a computing device, a user input indicative of a time of day;
    launching, by the computing device and in response to the user input, a calendar application on the computing device, wherein launching the calendar application begins an initialization process to generate an active graphical user interface of the calendar application, wherein the initialization process comprises:
        obtaining, by the computing device, a cached graphical user interface representation of a single graphical user interface stored by the calendar application when the calendar application was previously running;
        determining, based on the time of day, a portion of the cached graphical user interface representation, wherein the portion is less than the entire cached graphical user interface representation, wherein the determining comprises accessing an index with a mapping for the time of day to a location for the portion of the cached graphical user interface representation, and the user input indicative of the time of day is received by a second application different from the calendar application;
        generating, by the computing device, a preview of a graphical user interface of the calendar application by combining the portion of the cached graphical user interface representation with a meta element comprising an image descriptive of the cached graphical user interface representation; and
        presenting, by the computing device, the preview of the graphical user interface on a display of the computing device; and
    replacing, by the computing device, the preview of the graphical user interface with the active graphical user interface of the calendar application after the calendar application has finished the initialization process.

2. The method of claim 1, further comprising:
    determining, by the computing device, that the calendar application is terminating;
    in response to determining that the calendar application is terminating, generating the cached graphical user interface representation based on a current state of a graphical user interface of the calendar application; and
    storing, by the computing device, the cached graphical user interface representation.

3. The method of claim 1, further comprising:
    determining the portion of the cached graphical user interface representation to present on the display based on a size of the display.

4. The method of claim 3, wherein the cached graphical user interface representation is a static image of the graphical user interface of the calendar application.

5. The method of claim 1, wherein the computing device comprises a handheld device or a wearable device.

6. The method of claim 1, wherein the second application is a clock application.

7. A non-transitory computer readable medium including one or more sequences of instructions that, when executed by one or more processors, cause:
    receiving, by a computing device, a user input indicative of a time of day;
    launching, by the computing device and in response to the user input, a calendar application on the computing device, wherein launching the calendar application begins an initialization process to generate an active graphical user interface of the calendar application, wherein the initialization process comprises:
        obtaining, by the computing device, a cached graphical user interface representation of a single graphical user interface stored by the calendar application when the calendar application was previously running;

determining, based on the time of day, a portion of the cached graphical user interface representation, wherein the portion is less than the entire cached graphical user interface representation, wherein the determining comprises accessing an index with a mapping for the time of day to a location for the portion of the cached graphical user interface representation, and the user input indicative of the time of day is received by a second application different from the calendar application;

generating, by the computing device, a preview of a graphical user interface of the calendar application by combining the portion of the cached graphical user interface representation with a meta element comprising an image descriptive of the cached graphical user interface representation; and presenting, by the computing device, the preview of the graphical user interface on a display of the computing device; and replacing, by the computing device, the preview of the graphical user interface with the active graphical user interface of the application after the calendar application has finished the initialization process.

8. The non-transitory computer readable medium of claim 7, wherein the instructions further cause:

determining, by the computing device, that the calendar application is terminating;

in response to determining that the calendar application is terminating, generating the cached graphical user interface representation based on a current state of a graphical user interface of the calendar application; and storing, by the computing device, the cached graphical user interface representation.

9. The non-transitory computer readable medium of claim 7, wherein the instructions further cause:

determining the portion of the cached graphical user interface representation to present on the display based on a size of the display.

10. The non-transitory computer readable medium of claim 9, wherein the cached graphical user interface representation is a static image of the graphical user interface of the calendar application.

11. The non-transitory computer readable medium of claim 7, wherein the meta element comprises a header, title, or banner that describes the portion of the cached graphical user interface representation.

12. A system comprising:

one or more processors; and a non-transitory computer readable medium including one or more sequences of instructions that, when executed by one or more processors, cause:

receiving, by a computing device, a user input indicative of a time of day;

launching, by the computing device and in response to the user input, a calendar application on the computing device, wherein launching the calendar application begins an initialization process to generate an active graphical user interface of the calendar application, wherein the initialization process comprises:

obtaining, by the computing device, cached graphical user interface representation of a single graphical user interface stored by the calendar application when the calendar application was previously running;

determining, based on the time of day, a portion of the cached graphical user interface representation, wherein the portion is less than the entire cached graphical user interface representation, wherein the determining comprises accessing an index with a mapping for the time of day to a location for the portion of the cached graphical user interface representation, and the user input indicative of the time of day is received by a second application different from the calendar application;

generating, by the computing device, a preview of a graphical user interface of the calendar application by combining the portion of the cached graphical user interface representation with a meta element comprising an image descriptive of the cached graphical user interface representation; and presenting, by the computing device, the preview of the graphical user interface on a display of the computing device; and replacing, by the computing device, the preview of the graphical user interface with the active graphical user interface of the calendar application after the calendar application has finished the initialization process.

13. The system of claim 12, wherein the instructions further cause:

determining, by the computing device, that the application is terminating;

in response to determining that the calendar application is terminating, generating the cached graphical user interface representation based on a current state of a graphical user interface of the calendar application; and storing, by the computing device, the cached graphical user interface representation.

14. The system of claim 12, wherein the instructions further cause:

determining the portion of the cached graphical user interface representation to present on the display based on a size of the display.

15. The system of claim 14, wherein the cached graphical user interface representation is a static image of the graphical user interface of the application.

16. The system of claim 12, wherein:

the portion of the cached graphical user interface representation illustrates a portion of a calendar; and the meta element describes which calendar is associated with the portion of the calendar.

17. The system of claim 12, wherein:

the second application is a clock application; and the portion of the cached graphical user interface representation is of at least a portion of a calendar including the time of day.

* * * * *